United States Patent [19]

Figg et al.

[11] 4,294,645

[45] Oct. 13, 1981

[54] LABEL APPLICATORS

[75] Inventors: Anthony V. J. Figg, Spalding; Harry Cunnington, Boston, both of England

[73] Assignee: Norprint Limited, Boston, England

[21] Appl. No.: 74,724

[22] PCT Filed: Jan. 11, 1979

[86] PCT No.: PCT/GB79/00005

§ 371 Date: Sep. 12, 1979

§ 102(e) Date: Sep. 12, 1979

[87] PCT Pub. No.: WO79/00499

PCT Pub. Date: Aug. 9, 1979

[30] Foreign Application Priority Data

Jan. 12, 1978 [GB] United Kingdom ................. 1160/78
Jul. 20, 1978 [GB] United Kingdom ............... 30511/78

[51] Int. Cl.³ .............................................. B32B 31/00

[52] U.S. Cl. .................................... 156/384; 156/542; 156/584

[58] Field of Search ................................ 156/540–542, 156/532, 528, 584, 344, 384–386

[56] References Cited

U.S. PATENT DOCUMENTS

| | | | |
|---|---|---|---|
| 3,219,511 | 11/1965 | Moser et al. | 156/532 |
| 3,650,876 | 3/1972 | Stageberg | 156/584 |
| 3,668,047 | 6/1972 | Heller | 156/541 |
| 3,793,124 | 2/1974 | Babb et al. | 156/532 |
| 4,017,350 | 4/1977 | Thomas | 156/584 X |

*Primary Examiner*—David A. Simmons
*Attorney, Agent, or Firm*—Leydig, Voit, Osann, Meyer & Holt, Ltd.

[57] ABSTRACT

A label applicator and registration device for such an applicator are disclosed.

The applicator includes along the path of a web including both a backing strip and a series of contact-adhesive coated labels, a web reel mounting, a brake for preventing overrun of the web from its mounting and to provide tension in the web, a registration device of generally triangular section, a dispense edge for detaching the labels from the backing strip, a take-up mounting for spent backing strip, and an elongate slide operable by a "stamp" action to actuate the various parts enumerated.

The registration device may co-operate with projections which engage transverse edges of the device.

The applicator can be used wherever price and similar labels are to be applied to goods. The registration device is applicable to label applicators whether powered or manual and is disposed upstream of any dispense edge of such applicators.

19 Claims, 7 Drawing Figures

LABEL APPLICATORS

BACKGROUND OF THE INVENTION

1. Field of the Invention

This invention relates to label applicators for use, for example, in applying price labels to articles sold in retail establishments.

2. Description of the Prior Art

Numerous label applicators have been proposed and are in use which are operated manually and which serve to print and dispense a label by actuation of the applicator. The labels used in such applicators have a layer of self-adhesive medium one face and the labels are held together to form a web by a backing strip of paper treated with a release agent such as a silicone.

Many previously proposed applicators and applicators in use involve a trigger-like action in order to effect their working cycle. While label applicators which use a trigger or similar squeeze action on an actuating member are satisfactory for many purposes, their use may involve some difficulty for the user when the articles to be labelled are contained in a box or other large container so that the edges of the box tend to interfere with the application of labels to articles which are adjacent to the walls of the box.

To overcome the difficulties, it has already been proposed to provide a label applicator which operates with a straightforward stamp impression action to that required for a conventional data stamp, the operation of such applicators involving movement of an actuating member by way of a plunging action to cause the necessary operating cycle of the applicator. The action involved may be likened to that of a pogo-stick but the previously proposed applicators have not found favour in use because of their complex construction and often a substantial lateral bulk prevents their use in the circumstances referred to above where obstruction hinders or prevents application of labels to an article.

It has been proposed in British Patent Specification No. 1,116,124 to provide a label printing and dispensing apparatus which is operable in the manner of a data stamp, and which, moreover, includes a mounting for a fresh label web and a mounting for a reel carrying spent backing strip. A linear-acting registration device serves to register individual labels for printing and dispensing purposes but it requires the use of special labels each of which has a transverse ridge to enable proper registration.

Clearly the need to use such labels is disadvantageous because they involve a special manufacturing process which renders them costly and the thickness of the ridges can, when the labels are in reel form, double the size of the reel in comparison with plain labels.

One object of the present invention is to provide a label applicator which can use plain labels, i.e. without holes, apertures, ridges or edgewise cuts, but nevertheless maintain good registration for printing and dispensing purposes.

Another object of the present invention is to provide a label applicator which can be used in situations where there is little lateral space available.

SUMMARY OF THE INVENTION

According to the present invention there is provided apparatus for dispensing individual labels from a web of labels including a backing strip and a series of labels mounted on the backing strip, said apparatus comprising in succession along a web path through the apparatus, reel mounting means for carrying a reel of the said web, continuously-operative brake means for applying a continuous braking force to the web, a rotary registration device cooperating with the web, dispensing means at which individual labels can be peeled from the backing strip of the web, a take-up reel for taking up spent backing strip, and means for synchronously actuating the registration device and the take-up reel to index the web through the apparatus and dispense a label at the dispensing means.

Further according to the present invention, there is provided apparatus for printing and dispensing labels from a label web including a release agent coated backing strip and a series of rectangular, pressure-sensitive adhesive coated labels on one face thereof, said apparatus comprising a frame, an elongate actuating member slidable relatively to the frame, an elongate actuating member slidable relatively to the frame and having actuating means spaced along its length, web-carrying reel means mounted on the frame, takeup reel carrying means mounted on the frame for receiving spent backing strip, and in sequence along the web path from the web-carrying reel means to the take-up carrying reel means, a web brake, a triangular prism label registration device having operative areas corresponding in size to that of an individual label, a printing mechanism, a printing platen which also forms a dispense edge, said platen serving to support a said label during printing thereof, and means for guiding the spent backing strip to the take-up reel, said apparatus being arranged to carry out all necessary operations to print and dispense a label in a forward stroke of the elongate actuating member and to return parts of the apparatus to their respective rest positions during the return stroke of the apparatus.

Embodiments of hand-held label applicators in accordance with the invention will now be described, by way of example, with reference to the accompanying diagrammatic drawings, in which.

Figure 1:
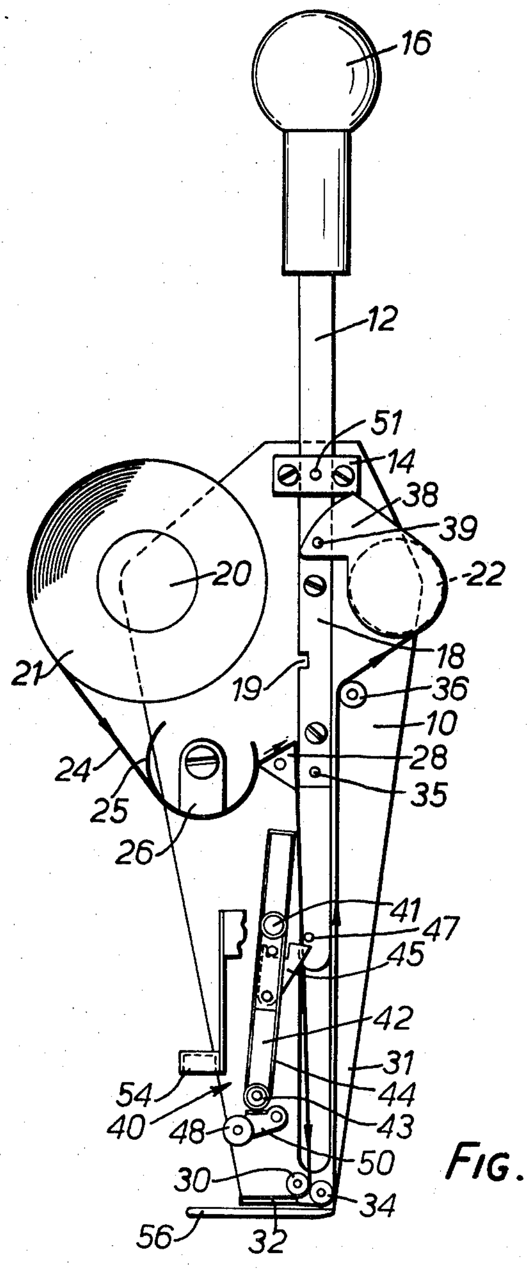
FIG. 1 is a side elevation of the hand-held label applicator in accordance with the invention in a first, rest, configuration.
Figure 2:
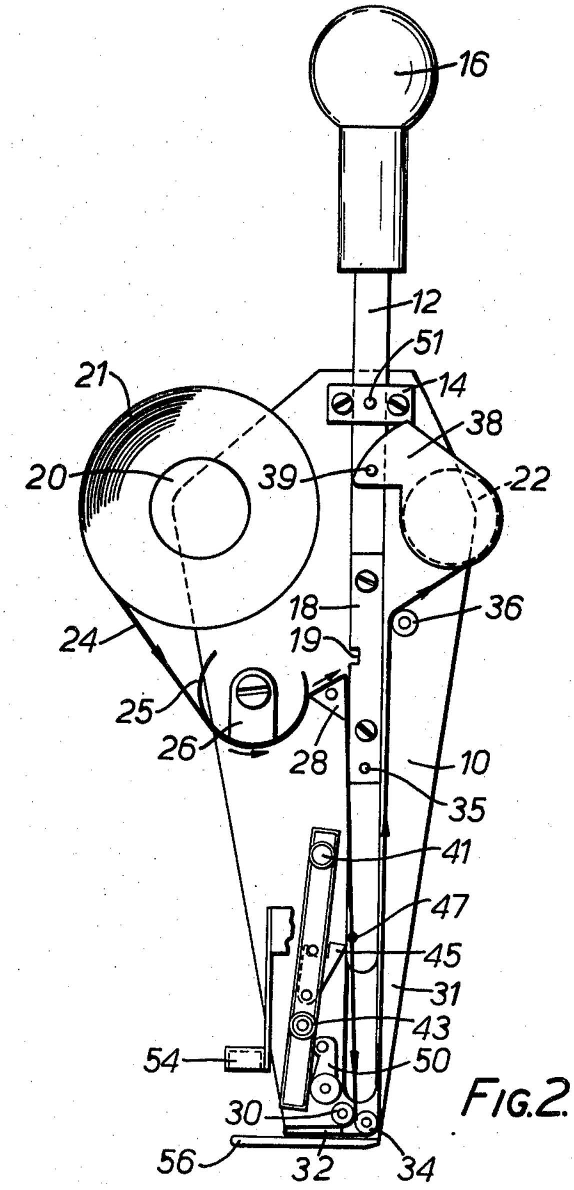
FIG. 2 is a side elevation of the applicator similar to that of FIG. 1, but showing parts of the applicator in a second configuration when printing of a label is about to occur.

Referring now to the drawings and in particular to FIG. 1, the applicator comprises a plate frame 10 which carries in a groove thereof a rectilinear, elongate, slide member 12 held on the frame for sliding motion by a bridge member 14 and carrying at its upper end a knob or handle 16. The slide member 12 carries a strip cam member 18 with a notch 19. All the working parts of the applicator are carried on one face of the frame 10. The latter can therefore serve as a part of an external casing, not otherwise shown.

The generally elongate frame 10 carries near its upper end (as shown) a reel mounting 20 on which a reel of label web 21 is mounted and also carries on the opposite side of the frame 10 a take-up reel mounting 22 incorporating two-way clutches. The mounting 22 serves to carry the spent backing strip of the label web reel 21 and even when carrying its full length of backing strip has a maximum diameter substantially less than the full diameter of the fresh web reel.

For convenience other parts of the applicator will now be described as they are encountered along the label web path. Starting from the full, web, reel 21, the label web 24 passes around a part-circular leaf spring 25 supported on a member 26 screwed to the frame. One end portion of the leaf spring 25 abuts a prismatic capstan 28 and the other end portion of the leaf spring serves to prevent snatch from the label web reel 21 when the applicator is actuated. The curvature of the leaf spring is selected to avoid any risk that labels will become detached from the backing strip as the web moves along the surface of the spring.

As is described in detail in our co-pending British Application No. 4157/78 the label web is made up of a longitudinal series of rectangular labels (or labels of parallelogram shape) separated from one another by a groove which does not, however, extend right through the thickness of the paper. The lengths of sides of the capstan 28 are precisely matched to the distances between the grooves of the label web. A conventional backing strip of silicone-treated paper is employed.

After leaving the capstan 28, the label web 24 passes round a roller 30 adjacent the bottom end of the frame 10 and the roller is freely mounted for rotation thereon. Thereafter, the web passes over and around a dispense edge member (of conventional form) 32 which also serves as a printing platen and the spent backing strip 31 after detachment of the labels then passes around a further roller 34 freely rotatably mounted at the lower end of the frame adjacent the roller 30, around a freely-rotatable roller 36 mounted just below the re-wind reel mounting 22 and finally is taken up on the re-wind adjacent the upper end of the frame.

The capstan 28 is illustrated as having three sides, but other numbers of sides can be used in which case it may be necessary to change the angles of the grooves in the labels. Instead of a capstan as illustrated other rotatable members can be used, provided they define sides corresponding to one label pitch.

Figure 3:
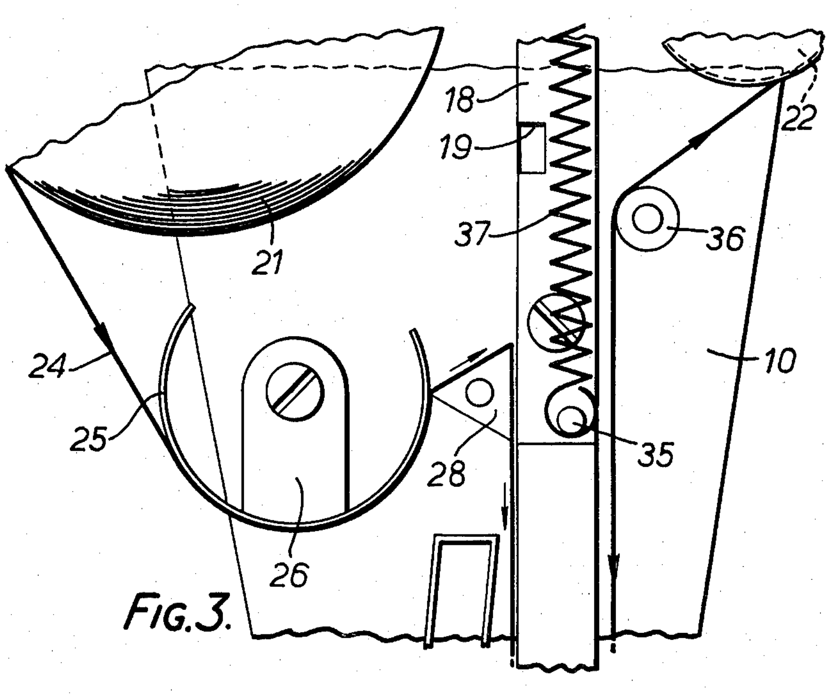
FIG. 3 is a side elevation showing a detail of the applicator of FIG. 1 and 2 with the parts shown as in the configuration of FIG. 1.
Figure 4:
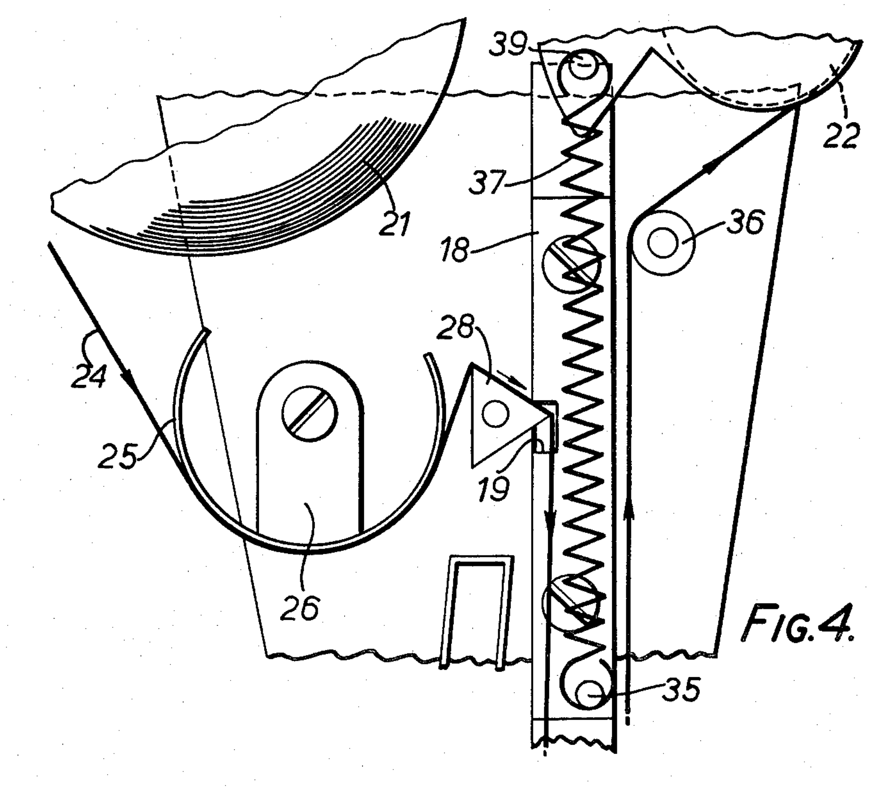
FIG. 4 is a side elevation of the detail of FIG. 3, but with the parts in a configuration when the label web is being indexed forward.

The web is driven by actuation of the handle 16 in a downwards direction through a Torrington one-way clutch within the reel mounting 22 (not shown) and through the intermediary of a quadrant 38 acting on the re-wind reel spindle. The quadrant 38 is subject to the action of a tension spring 37 (FIGS. 3 and 4) extending between a post 39 on the quadrant and a post 35 on the strip cam member 18. The return stroke of the quadrant 38 cannot drive the Torrington one-way clutch because of the incorporation of a second Torrington one-way clutch (not shown) acting upon the spindle (not shown) of the take-up reel 22.

The applicator incorporates a print head 40 which comprises a frame 42 carrying a plurality of bands 44 with print facets and also positive, read-out, facets and is mounted on the frame 10 by means of two pillars 41,43 which are so disposed that the print head 40 as a whole is inclined at an angle to the length of the slide member 12. The frame of the print head carries a pivotal latch 45 and the print head 40 is subjected to the biasing action of a tension spring (not shown) connected between a pin on the frame and the latch 45. The print head 40 is driven by the slide member 12 through a pin 47 and the latch 45. Because of the diverging angle between the slide member 12 and the print head 40, the pin 47 disengages the latch 45 immediately a label has been printed. On the return stroke of the slide member the latch 45 pivots to avoid the pin 47, but the latch is returned to its position, as shown, by its biasing spring (not shown).

The inking of the operative facets of the prints head 40 under any given adjustment is effected by an ink roller 48 mounted on an arm 50 pivoted to the frame 10. The arm, and hence the roller, are connected by a spring (not shown) to the pillar 43 which also serves to mount the lower end of the print head frame 42. The roller 48 is so disposed under the action of the biasing spring and a stop (not shown) that the operative facets of the print head acts to displace the inking roller as the head moves downwardly and in so doing provides a layer of ink on those facets.

The applicator includes an applying pad 54 of soft rubber or plastics attached to the slide member 12 by a bracket (not shown) spanning the print head 40 and the slide member 12 and the pad is hollow so that when used to apply a label to an article the printed characters will not be smeared or smudged. The soft rubber of the pad 54 enables it to conform to the local contour of an article being labelled. The frame 10 also carries a foot 56 which defines a sufficient area to ensure that the applicator will be steady when resting on the surface about to receive a label. The foot 56 is provided with an aperture (not shown) through which the label just printed can be applied to the article and the aperture of the foot thus provides a sightframe so that the precise location and orientation of a label can be predicted before a label is actually applied. The return stroke of the slide member is energized by a spring (not shown) acting between the post 35 and the post 51 on the bridge member 14.

The operation of the applicator will now be described. Essentially, the operation takes place in the manner of a simple impression stamp, such as a date stamp, the only additional action being the pressure required to displace the slide member 12 longitudinally with respect to the frame 10. Before the handle is depressed, the foot 56 at the lower end of the frame is placed in a desired location on an article if the precise location is critical and again, if desired, the precise orientation of the label when applied can be predetermined. It is not, however, essential to make use of the sighting properties of the foot if high speed of operation is essential. In the latter event the foot 56 merely serves to steady the applicator. One particular advantage of the applicator in accordance with the invention is that a label is fed forward from the reel, printed, dispensed and positively applied to an article during one half of the stroke of the applicator only, the second half of the stroke merely serving to return the various operative parts to the rest configuration (FIG. 1) perparatory to the feeding, printing and application of the next label.

During the first part of the stroke, the print head 40 is operated by engagement of the pin 47 carried by the slide member 12 on the latch 45 of the print head 40 and the stroke of the print head ceases when the operative print facets contact a label on the platen 32 about to be dispensed, but still adhered to the backing strip. The Friction between the web 116 and the guide member 112 provides braking action on the web and thus ensures adequate but not excessive tension in the web both upstream and downstream of the registration member 118. The member 112 therefore also acts as brake means.

The hereinbefore described registration device has the important advantage that it can be incorporated upstream of a dispense edge of a label or ticket applicator or dispenser and the force required to feed a web through the apparatus is reduced because the friction force generated at the dispense edge does not need to be overcome. In combination with a label web with notches extending into a depth of the web, arcuate registration can be achieved, and it becomes possible to incorporate a re-wind reel for spent backing strip downstream of the dispense edge.

We claim:

1. Apparatus for dispensing individual labels from a web of labels including a backing strip and a series of labels mounted on the backing strip, said apparatus comprising in succession along a web path through the apparatus, reel mounting means for carrying a reel of the said web, continuously-operative brake means for applying a continuous braking force to the web, a rotary registration device co-operating with the web, dispensing means at which individual labels can be peeled from the backing strip of the web, a take-up reel for taking up spent backing strip, and means for synchronously actuating the registration device and the take-up reel to index the web through the apparatus and dispense a label at the dispensing means.

2. Apparatus according to claim 1 wherein the registration device comprises a member rotatable in steps by the actuating means and defining a plurality of areas corresponding to the number of indexing steps for one complete revolution, the dimension of each area corresponding to the length direction of the web being equal to the length dimension of each said label.

3. Apparatus according to claim 1, wherein the brake means comprises a resilient member of arcuate form.

4. Apparatus according to claim 1, comprising a one-way clutch operating the take-up reel and a one-way clutch operating the web reel.

5. Apparatus according to claim 1, wherein the actuating means comprises an elongate rectilinear member carrying means which serve during a forward stroke of the actuating means to effect indexing dispensing of a label, the return stroke serving only to re-position the operative parts of the apparatus ready for the next operating cycle.

6. Apparatus according to claim 1, comprising printing means actuable by the said actuating means and a printing platen serving to support a label for printing by the printing means, the platen being disposed immediately adjacent the dispensing means.

7. Apparatus according to claim 1, comprising pad means for applying pressure to a dispensed level immediately after dispensing, the pad means being actuable by the said actuating means.

8. Apparatus for printing and dispensing labels from a label web including a release agent coated backing strip and a series of rectangular, pressure-sensitive adhesive coated labels on one face thereof, said apparatus comprising a frame, an elongate actuating member slidable relatively to the frame and having actuating means spaced along its length, web-carrying reel means mounted on the frame, take-up reel carrying means mounted on the frame for receiving spent backing strip, and in sequence along the web path from the web-carrying reel means to the take-up reel carrying means, a web brake, a triangular prism label registration device having operative areas corresponding in size to that of an individual label, a printing mechanism, a printing platen which also forms a dispense edge, said platen serving to support a said label during printing thereof, and means for guiding the spent backing strip to the take-up reel, said apparatus being arranged to carry out all necessary operations to print and dispense a label in a forward stroke of the elongate actuating member and to return parts of the apparatus to their respective rest positions during the return stroke of the apparatus.

9. Apparatus for operating on a web of labels or tickets which web is divided transversely by weak zones separating individual labels, said apparatus including a registration device for the web comprising a rotatable member defining at least three generally concave areas, each area corresponding at least in the length direction of the web to the corresponding dimension of an individual label or ticket of the web and being defined by edges transverse to the web path corresponding to said zones separating the individual labels, actuating means of the apparatus serving to bring the said zones separating the individual labels into engagement with said edges by controlling in steps rotation of the rotatable member, and means serving to bias successive said zones of the web separating individual labels onto said edges whereby to ensure precise registration of the zones and edges irrespective of the manner of operation of the apparatus.

10. Apparatus according to claim 9, wherein three said areas are defined on the rotatable member so that in operation each rotational step effected by the actuating means rotates the member through 120°.

11. Apparatus according to claim 10, wherein each said area is substantially equal to the area of a label.

12. Apparatus according to claim 9, wherein the registration device is disposed upstream of a dispense edge at which individual labels are peeled from the web in the direction of advance of the web path through the apparatus.

13. Apparatus according to claim 12, comprising brake means, and a web reel mounting the registration device, the brake means being disposed in the web path between the reel mounting and the registration device.

14. A registration device for individual labels of a web of tickets or labels having transverse weak zones extending into the depth of the web between adjacent labels, said device comprising a step-wise rotatable member incorporating means defining at least three areas corresponding in number to the number of steps in one revolution return stroke of the print head is effected by the tension spring acting between the posts 41 and the pivot of the latch 45. The inking roller 48 in the rest configuration lies in the path of the operative prin facets and is pushed out of the way and at the same time inks these facets just before the printing action occurs. The facets are re-inked as the print head carries out its return stroke since the ink-roller is spring biased to the position shown in FIG. 1.

Again, during the first part of the stroke of the slide member 12, the quadrant 38 acting on the re-wind reel mounting is energized to turn by the tension spring acting between the posts 35 and is restrained only by the web which is securely held by the capstan 28 and as the slide member 12 continues to move downwards the capstan which is initially prevented from turning by the strip cam member 18 is finally released to rotate through one third of a turn as it engages in the notch 19 in one side of the strip cam member 19. The capstan thereby causes the web 24 to move forward through the pitch of one label and under the action of the quadrant spring the re-wind reel is turned sufficiently to take up the slack in the backing strip 31 corresponding to the label pitch.

At this part of the stroke the label is projecting partially from the dispense edge and platen member 32 and the remainder of the forward stroke is taken up by applying the pressure pad 54 which moves with the main slide and this presses the label firmly on the article at the end of the stroke of the slide member 12.

Immediately pressure on the handle is released it moves upwardly under the action of the return spring assisted by the tension spring acting on the quadrant. During this return stroke the latch 45 of the print head is pushed aside by the pin 47 at the lower end of the slide member 12 and is thus reset for the next operation. The upper edge of the strip cam member 18 returns the quadrant 38 to the position shown in FIG. 1 where the upper edge of the quadrant abuts the bridge member 14.

Under these conditions the quadrant member 38 is in a neutral position, and does not act to move the backing strip 31 on the re-wind reel. As the re-wind reel increases in diameter, it follows that each label pitch represents a lesser arcuate movement so that the spring 37 is extended further and gives the required increased tension for an appropriate increase in diameter of the re-wind reel.

In the applicator hereinbefore described the fresh label web reel and the take-up reel are mounted for rotation on parallel axes. By providing a label web with labels of rhomboidal or parallelogram shape as disclosed in our copending British Application No. 4157/78 it becomes possible to mount the reels side-by-side on the same or substantially the same axis. This will enable the cross-section of the applicator to be more compact, and thus gives even easier access to articles lying close to obstructions. In such a modification the dispense edge member must be appropriately angled.

Figure 5:
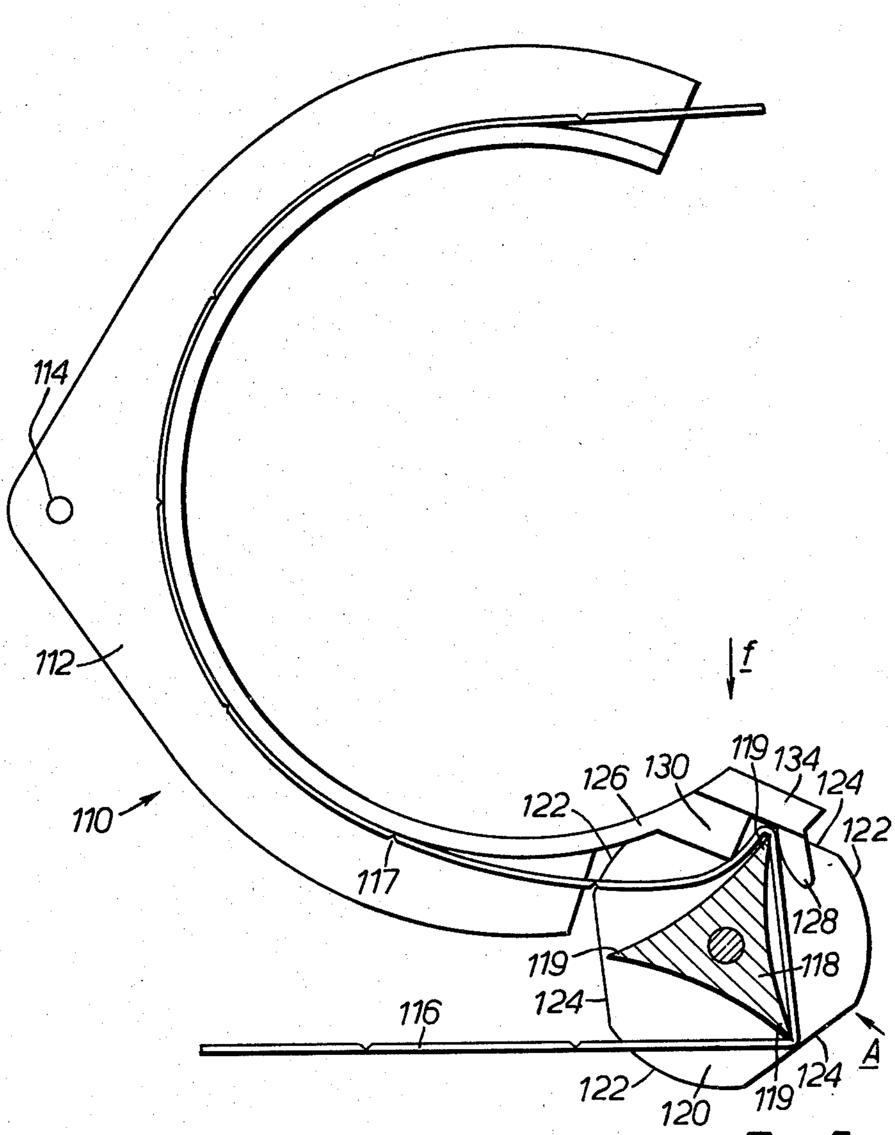
FIG. 5 is a side elevation of a registration device of a label applicator in one configuration.
Figure 6:
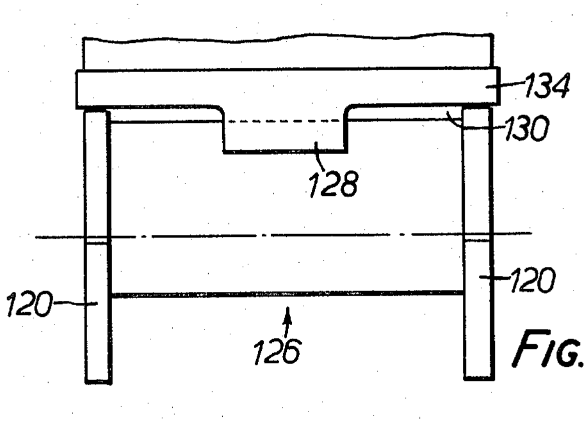
FIG. 6 is a fragmentary view in the direction of the arrow A of FIG. 5.

Turning now to FIGS. 5 and 6, the label registration device 28 as shown in FIGS. 1 to 4 and designated here as 110 includes a pivotally-mounted arcuate web guide 112 arranged to make small pivotal movements about a pivot point 114; this guide serves to guide a label web 116 to a registration member 118 of trigonal form with concave sides, having a width at least as large as the label web and having three apices 119. The guide also acts to provide a braking force on the web.

The registration member 118 is mounted for rotation and is integral with two cam members 120 each having three arcuate portions 122 and three flats 124, the flats extending at right angles to the median line passing through the apex of the trigonal member. One member 120 is mounted at each end of the registration member 118 and may be integral therewith.

The guide member 112 carries a tongue member 126 resiliently biased by a spring force indicated by the arrow f and the tongue member 126 carries two projections 128,130 which, as will be apparent from FIG. 5, fit over the one of the apices 119 of the trigonal member 118 in order to ensure that the label web 116 is properly seated at one of the V-shaped notches 117 thereof as the device is indexed.

FIG. 6 further illustrates the tongue member 126 and as will be apparent the pivotal action of the member 112 permits rotation of the trigonal member and associated cams, but is limited by the spring force f.

Figure 7:
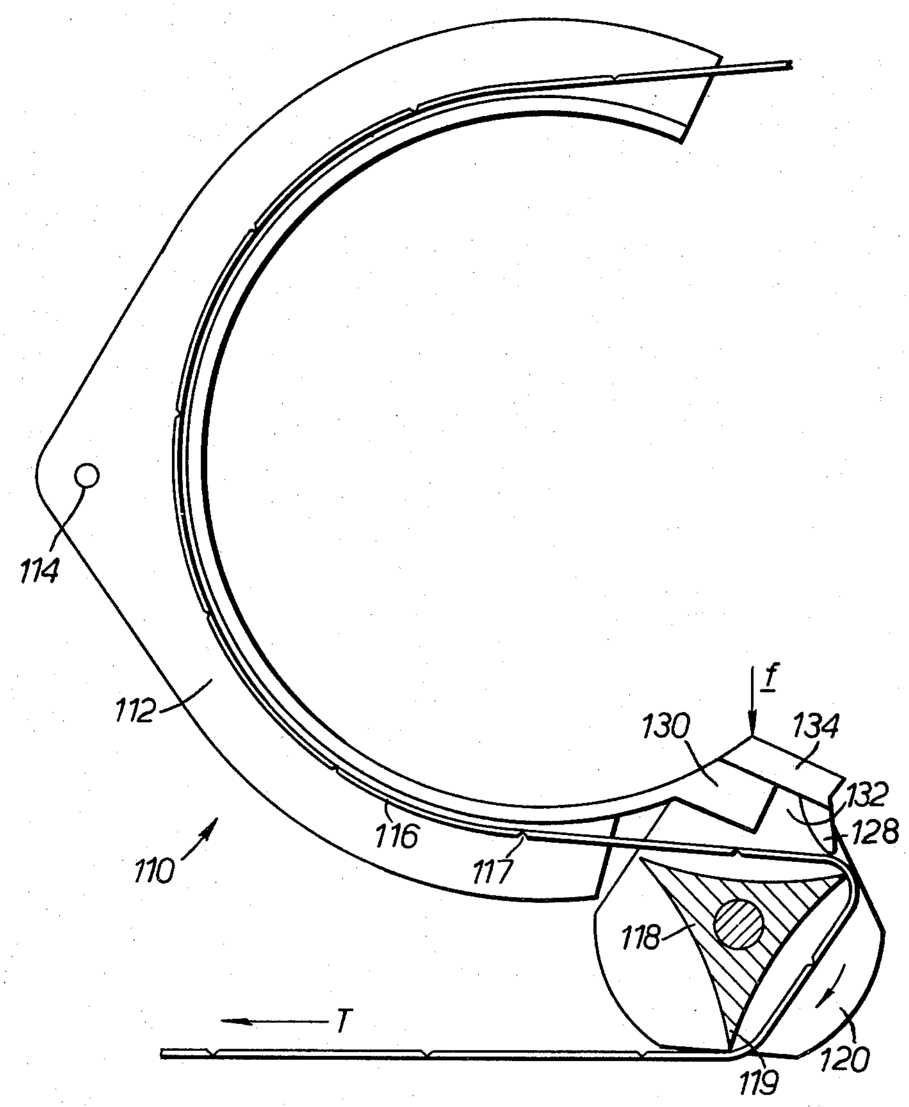
FIG. 7 is a side elevation of the registration device in a different configuration to that of FIG. 1.

FIG. 7 illustrates a condition when the web 116 is not in registration with the registration member 118. As will be apparent the apices of the member cannot fit into one of the notches 117 of the web until such time as one of the apices 119 slides along the web into a notch 117 and thus into the recess 132 formed between the projections 128,130 of the tongue member.

When in the configuration illustrated in FIG. 7 the web will be moving faster than the linear component of velocity in the direction of movement of the web of the apices of the member 118. This arises because of the tension T in the web and the next groove of the web therefore overtakes the next apex and the groove then engages the apex. The tongue member also includes a transverse cam follower member 134 which co-operates with the cam members 120.

The letter T indicates the tension which is applied to the web downstream of the registration device 110 in the direction towards the printing platen of the associated applicator such as that disclosed in our co-pending British Application No. 29744/78. After each use of the registration device the labels downstream thereof will remain in their predetermined position dictated by engagement of two apices of the registration member in a corresponding two notches 117 of the web 116 so that there is no possibility of printing being carried out at the wrong location on the labels.

As will be apparent from FIG. 5, the projection 130 acts as the member 118 is rotated to push a label towards the related surface of the member. This action also serves to force two apices 119 of the member 118 firmly into two adjacent notches 117 of the web 116. The motion of the tongue member is controlled by interaction of the cam surfaces 120,122 and the transverse cam follower member 134 at the tip of the tongue member. By selection of the cam profile of the members 120, the manner in which the projections 128,130 co-operate with the registration member 118 is accurately controlled and the risk that rough actuation of the associated applicator will result in mis-registration is minimized.

The arcuate portions 122 of the cam members 120 pivot the guide member 112 to allow fresh registration of the web, after a given label has been dispensed. Re-registration occurs when two notches 117 engage two apices 119 and the cycle is thus repeated. Each indexing step will rotate the member 118 through 120°. For a four-sided member the index rotation will be 90°.

of the member, the areas being arranged around the axis of rotation of the member and including transverse edges defining in part, the areas, a pivotal guide and brake member disposed upstream in the web path of the rotatable member and means which serve to bias the web on to the rotatable member whereby to ensure engagement of the weak zones of the web on to transverse edges irrespective of the manner of operation of the registration device.

15. A device according to claim 14, wherein the biasing means and the pivotal guide and brake member form an assembly and the biasing means include projections which engage said transverse edges defining said areas of the rotatable member.

16. A device according to claim 14, comprising cam means rotatable with the rotatable member and co-operating with the pivotal guide and brake member to vary the action of the biasing means in co-operation with tension applied to the web downstream of the rotatable member.

17. A device according to claim 14, wherein the rotatable member is a trigonal prism with concave faces each defining one said area.

18. A device according to claim 17, wherein the cam means are rigid with the trigonal prism.

19. A device according to claim 14, wherein the biasing means includes a tongue member with two projections with a recess between the projections arranged to engage in succession edge of the rotatable member whereby to bias a portion of the label web into engagement with the edges.

* * * * *